(12) United States Patent
Ram et al.

(10) Patent No.: US 7,807,015 B2
(45) Date of Patent: Oct. 5, 2010

(54) ADHESION PROMOTER

(75) Inventors: Jyothsna Ram, Rochester, NY (US); David P. Van Bortel, Victor, NY (US); Guiqin Song, Milton (CA); Nan-Xing Hu, Oakville (CA); T. Brian McAneney, Burlington (CA); Gordon Sisler, St. Catharines (CA); Stephan V. Drappel, Toront (CA)

(73) Assignee: Xerox Corporation, Norwalk, CT (US)

( * ) Notice: Subject to any disclaimer, the term of this patent is extended or adjusted under 35 U.S.C. 154(b) by 676 days.

(21) Appl. No.: 11/532,704

(22) Filed: Sep. 18, 2006

(65) Prior Publication Data

US 2008/0071043 A1 Mar. 20, 2008

(51) Int. Cl.
 *B32B 7/12* (2006.01)
(52) U.S. Cl. ............... 156/327; 106/287.1; 106/287.15
(58) Field of Classification Search ................ 525/476, 525/477; 106/287.1; 156/327
See application file for complete search history.

(56) References Cited

U.S. PATENT DOCUMENTS

| | | | | |
|---|---|---|---|---|
| 3,500,603 A * | 3/1970 | Strack | ............... | 52/204.591 |
| 3,644,245 A * | 2/1972 | Flanagan et al. | ............ | 524/262 |
| 3,758,423 A * | 9/1973 | Taylor | ............... | 528/27 |
| 3,792,002 A * | 2/1974 | Krieger et al. | ............... | 524/169 |
| 3,981,851 A * | 9/1976 | Plueddemann | ............... | 524/243 |
| 4,000,347 A * | 12/1976 | Ranney et al. | ............... | 428/419 |
| 4,029,827 A | 6/1977 | Imperial et al. | | |
| 4,093,673 A * | 6/1978 | Chang et al. | ............... | 525/102 |
| 4,101,686 A | 7/1978 | Strella et al. | | |
| 4,185,140 A | 1/1980 | Strella et al. | | |
| 4,440,829 A * | 4/1984 | Gerace et al. | ............... | 428/343 |
| 4,716,194 A * | 12/1987 | Walker et al. | ............... | 524/806 |
| 4,831,080 A * | 5/1989 | Blizzard et al. | ............... | 525/100 |
| 4,948,366 A * | 8/1990 | Horn et al. | ............... | 433/9 |
| 5,021,507 A * | 6/1991 | Stanley et al. | ............... | 525/127 |
| 5,028,485 A * | 7/1991 | van Hooijdonk | ...... | 428/355 BL |
| 5,157,445 A | 10/1992 | Shoji et al. | | |
| 5,244,996 A * | 9/1993 | Kawasaki et al. | ........... | 526/347 |
| 5,512,409 A | 4/1996 | Henry et al. | | |
| 5,516,361 A | 5/1996 | Chow et al. | | |
| 5,531,813 A | 7/1996 | Henry et al. | | |
| 5,631,082 A * | 5/1997 | Hirose et al. | ............... | 428/343 |
| 5,716,747 A | 2/1998 | Uneme et al. | | |
| 5,747,212 A | 5/1998 | Kaplan et al. | | |
| 6,071,830 A * | 6/2000 | Matsuzawa et al. | ......... | 438/778 |
| 6,183,929 B1 | 2/2001 | Chow et al. | | |
| 6,235,356 B1 * | 5/2001 | Shibuya et al. | ............... | 428/34 |
| 6,299,975 B1 * | 10/2001 | Takahira et al. | ............. | 428/343 |
| 6,491,992 B1 * | 12/2002 | Koizumi et al. | ............... | 428/34 |
| 6,492,028 B2 * | 12/2002 | Kotera et al. | ............. | 428/424.8 |
| 6,686,002 B2 * | 2/2004 | Auerbach | .................... | 428/34 |
| 6,759,129 B2 * | 7/2004 | Fukushi | ..................... | 428/412 |
| 7,267,854 B2 * | 9/2007 | Auerbach | .................... | 428/34 |
| 2003/0108737 A1 | 6/2003 | Timmons et al. | | |
| 2004/0115341 A1* | 6/2004 | Rantala et al. | ............. | 427/123 |
| 2004/0185272 A1 | 9/2004 | Kaplan et al. | | |
| 2006/0008727 A1 | 1/2006 | Gervasi et al. | | |

* cited by examiner

*Primary Examiner*—Randy Gulakowski
*Assistant Examiner*—Robert Loewe
(74) *Attorney, Agent, or Firm*—Oliff & Berridge, PLC

(57) ABSTRACT

An adhesion promoter comprising a silane compound and at least one of (1) a release agent, or (2) an adhesive, and methods of applying the adhesion promoter.

16 Claims, No Drawings

ADHESION PROMOTER

BACKGROUND

Described herein is an adhesion promoter comprising a silane compound and (1) a release agent, and/or (2) an adhesive. In embodiments, the silane compound may be applied as a surface treatment to a substrate, the silane compound may be included in a release agent that remains on a substrate after release from a fuser, or the silane compound may be included in an adhesive that is to be applied to a substrate.

REFERENCES

In a typical imaging device, a light image of an original to be copied is recorded in the form of a latent image upon a photosensitive member, and the latent image is subsequently rendered visible by the application of resin particles and pigment particles, or toner. The visible toner image is then in a loose powdered form and can be easily disturbed or destroyed. The toner image is usually fixed or fused upon a support, which may be a support sheet such as plain paper.

To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset.

U.S. Pat. No. 4,029,827 discloses the use of polyorganosiloxanes having mercapto functionality as release agents.

U.S. Pat. No. 4,101,686 and U.S. Pat. No. 4,185,140 disclose polymeric release agents having functional groups such as carboxy, hydroxy, epoxy, amino, isocyanate, thioether, or mercapto groups.

U.S. Pat. No. 5,157,445 discloses toner release oil having a functional organopolysiloxane.

U.S. Pat. No. 5,512,409 teaches a method of fusing thermoplastic resin toner images to a substrate using amino functional silicone oil over a hydrofluoroelastomer fuser member.

U.S. Pat. No. 5,516,361 teaches a fusing member having a thermally stable hydrofluoroelastomer surface and having a polyorgano T-type amino functional oil release agent. The oil has predominantly monoamino functionality per active molecule to interact with the hydrofluoroelastomer surface.

U.S. Pat. No. 5,531,813 discloses a polyorgano amino functional oil release agent having at least 85% monoamino functionality per active molecule to interact with the thermally stable hydrofluoroelastomer surface of the fuser member.

U.S. Pat. No. 5,716,747 discloses the use of fluorine-containing silicone oils for use on fixing rollers with outermost layers of ethylene tetrafluoride perfluoro alkoxyethylene copolymer, polytetrafluoroethylene and polyfluoroethylenepropylene copolymer.

U.S. Pat. No. 5,747,212 discloses an amino functional oil.

U.S. Pat. No. 6,183,929 discloses a release agent comprising an organosiloxane polymer containing amino-substituted or mercapto-substituted organosiloxane polymers and a nonfunctional organosiloxane polymer.

U.S. Pat. No. 4,029,827 describes the use of polymeric release agents having functional groups, which interact with a fuser member to form a thermally stable, renewable self-cleaning layer having good release properties for electroscopic thermoplastic resin toners.

SUMMARY

In embodiments, an adhesion promoter comprises a silane compound and at least one of (1) a release agent, or (2) an adhesive.

In further embodiments, described is a method of promoting adhesion of an adhesive to a substrate, comprising applying a surface treatment comprising a silane compound and a solvent to the substrate, and applying an adhesive to the substrate having the surface treatment thereon. A toner image may cover any portion of the substrate, and the toner image may be at least partially covered by a release agent.

In yet further embodiments, described is a method of promoting adhesion of an adhesive to a substrate at least partially covered with a release agent, comprising adding a silane compound to the release agent such that the silane compound chemically bonds to the release agent, forming a toner image on the substrate such that when the substrate is released from a fuser roll of an imaging device, the toner image is at least partially covered by the release agent, and applying an adhesive to the toner image at least partially covered by the release agent, wherein the silane compound of the release agent also chemically bonds to the adhesive.

In still yet further embodiments, described is a method of promoting adhesion of an adhesive to a substrate, comprising adding a silane compound to the adhesive, and applying an adhesive to the substrate, wherein the silane compound chemically bonds to the adhesive. A toner image may cover any portion of the substrate, and the toner image may be at least partially covered by a release agent.

EMBODIMENTS

As explained above, it is known to apply release agents to the fuser roll to provide the necessary release of a substrate from the fuser roll after the toner image has been formed on the substrate. Release agents are known to those of ordinary skill in the art, and include release agents such as disclosed in U.S. Publication No. 2006/0008727, U.S. Publication No. 2004/0185272 and U.S. Publication No. 2003/0108737, each of which is incorporated herein by reference in its entirety. As used herein, "substrate" refers to any media that may be printed on, such as paper, pre-print forms, transparency, cardboard, cloth, etc.

Release agents are useful for releasing a substrate from a fuser roll found in an imaging device, such as in an electrophotographic device or an electrostatographic device. In such devices, some release agent may remain on a toner image that may cover any portion of the substrate and on the substrate itself. In other words, the release agent may at least partially cover a substrate having no toner image or a substrate having a toner image thereon. "Partially" refers to the release agent covering from about 1 percent to about 100 percent of the substrate, such as from about 10 percent to about 100 percent or from about 10 percent to about 90 percent of the substrate. Xerographic prints may be contaminated by a release agent or silicone fuser oil due to the printing process. The amino functional fuser oil may chemically bond to the surface of the prints because of the fusing process at high pressure and high temperature. The surface free energy (SFE) may thus dramatically drop from a range of higher than about 30 mN/m$^2$ to a range of from about 8 mN/m$^2$ to about 30 mN/m$^2$. Generally, commercially available hot melt adhesives bind to substrates having a SFE higher than about 30 mN/m$^2$.

Any release agent remaining on the substrate, with or without a toner image thereon, is detrimental to an adhesive adhering to the substrate having a toner image. This is particularly important when the substrate is to be laminated or coated with a hot melt adhesive, such as an adhesive used in bookbinding. This release agent may also prevent materials utilizing adhesives, for example, a POST-IT® note, from adhering to the substrate.

Thus, disclosed herein is an additive that promotes the adhesion of an adhesive to a substrate having a toner image thereon, wherein the substrate may be at least partially covered by a release agent. The additive may also promote adhesion of an adhesive to a substrate having no toner image or a substrate having a toner image without being covered by a release agent.

As described herein, typical release agents used in releasing a substrate from a fuser roll in an imaging device, which may include poly-organofunctional siloxanes, such as aminofunctional silicone oils, such as methyl aminopropyl methyl siloxane, ethyl aminopropyl methyl siloxane, benzyl aminopropyl methyl siloxane, dodecyl aminopropyl methyl siloxane, aminopropyl methyl siloxane, and the like. The additive disclosed herein is particularly suitable for use with an amino functional silicone oil but may be used with other functionalized release agents.

In embodiments, the adhesion promoter may be a silane compound, for example, a silane compound such as an alkyloxysilane compound or a glycidoxy silane compound. Further examples include organic silane compounds, which may be represented by the following formula:

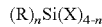

$(R)_n Si(X)_{4-n}$ wherein R is a $C_1$-$C_{30}$ hydrocarbyl including an alkyl, an aryl, a vinyl and the like, wherein said hydrocarbyl may further contain a halogen, nitrogen, oxygen or sulfur atom. Illustrative examples of R may include methyl, ethyl, propyl, octyl, phenyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group and the like. X may represent a hydrolyzable functional group, a $C_1$-$C_{20}$ alkoxy group, a halogen or a hydrogen atom, and n is an integer of 1, 2 or 3.

In embodiments, examples of silane compounds suitable for use herein include 4-aminobutyltriethoxysilane, 1-amino-2-(dimethylethoxysilyl)propane, N-(2-aminoethyl)-3-aminoisobutyldimethylmethoxysilane, N-(2-aminoethyl)-3-aminoisobutyldimethylmethoxysilane, (aminoethylaminomethyl)phenethyltrimethoxysilane, N-(2-aminoethyl)-3-aminopropylmethyldimethoxysilane, N-(2-aminoethyl)-3-aminopropylsilanetriol, N-(2-aminoethyl)-3-aminopropyltriethoxysilane, N-(2-aminoethyl)-3-aminopropyltrimethoxysilane, N-aminoethyl-AZA-2,2,4-trimethylsilacyclopentane, N-(6-aminohexyl)aminomethyltrimethoxysilane, N-(6-aminohexyl) aminopropyltrimethoxysilane, N-(2-aminoethyl)-11-aminoundecyl-trimethoxysilane, 3-aminopropylmethylbis(trimethylsiloxy)silane, 3-aminopropyldimethylethoxysilane, 3-aminopropyltrimethoxysilane, 3-aminopropyltris(methoxyethoxyethoxy)silane, 3-(triethoxysilyl)propylsuccinic anhydride, tris(3-trimethoxysilylpropyl)iso-cyanurate, (3-trimethoxysilylpropyl)diethylene-triamine, methyltrichlorosilane, dimethyldichlorosilane, methyltriethoxysilane, ethyltrichlorosilane, ethyltrimethoxysilane, dimethyldimethoxysilane, methyltriethoxysilane, ethyltriethoxysilane, propyltrimethoxysilane, amino silane hydrochloride, 3-glycidoxypropyl trimethoxysilane (Z-6040, available from Dow Corning; KBM 403, available from Shin-Etsu), methyltrimethoxysilane (Z-6070, available from Dow Corning; KBM 13, available from Shin-Etsu), methacryloxypropyltrimethoxysilane (Z-6030, available from Dow Corning; KBM502, available from Shin-Etsu), aminopropyltrimethoxysilane (Z-6011, available from Dow Corning; KBM903, available from Shin-Etsu), aminoethylaminopropyltrimethoxysilane (KBM603, available from Shin-Etsu or DOW Z 6032, available from Dow Corning; KBM603, available from Shin-Etsu), trifluoropropyltrimethoxysilane (KBM7103, available from Shin-Etsu), heptadecafluorodecyltrimethoxysilane (KBM7803, available from Shin-Etsu), isocyanatopropyltriethoxysilane (KBE9007, available from Shin-Etsu), aminopropyltriethoxysilane (KBE903, available from Shin-Etsu), aminoethylaminopropyltriethoxysilane (KBE603, available from Shin-Etsu), alkyltrimethoxysilane (DOW HV 10, available from Dow Korning), and a coating having trifluoropropy trimethoxysilane, vinylmethoxysilane, tetra(2-methoxyethoxy)silane (DOW 4040 Prime Coat, available from Dow Corning), and mixtures thereof.

The adhesion promoter disclosed herein may include more than one silane compound, for example, the adhesion promoter may include from 1 to about 15 silane compounds, such as from 1 to about 10 silane compounds or from 1 to about 8 silane compounds.

The desired silane compound may be utilized in a variety of ways to promote the adhesion of an adhesive to a substrate. The silane compounds promote adhesion to the substrate in locations where there is a toner image, where there is not toner image, and where there is a toner image at least partially covered by a release agent. In other words, a silane compound promotes adhesion of an adhesive to a substrate, regardless if the substrate has a toner image thereon or if the substrate has a toner image thereon that is at least partially covered by a release agent.

In embodiments, the silane compound may be included as a separate coating on the substrate, dispersed within a release agent, or dispersed within an adhesive.

In embodiments, the silane compound is applied to the surface of the substrate. The method of application can greatly vary. The silane compound may be applied by a variety of mechanical means, such as spraying, dip coating, hand coating, roll coating, in a web cassette, or the like. In embodiments, the silane compound may be applied in the xerographic printer, in an external stand alone unit, or in conjunction with a finishing unit, such as a book maker or a laminator, or the like.

In these embodiments, the surface of the substrate is treated with a solution comprising a silane compound as disclosed herein, or a mixture of silane compounds. The adhesion promoter may be dispersed in an organic or aqueous solvent, for example water, methanol, alcohol, isopropanol, acetone, ethyl or methyl acetate, combinations thereof and the like, to form a solution for application. For less soluble silane compounds, a surfactant may be optionally added to assist the silane in dissolving in the solvent. The optional surfactant may be an anionic surfactant, a nonionic surfactant, a silicone surfactant or a fluorosurfactant. The solution may be applied by any known suitable method such as with a wipe, a web, sprayed or rolled on, to form a coating on the substrate. The solution may be applied after any toner image is formed on the substrate and has dried, but before application of the adhesive. The adhesion promoting solution may be applied in any effective thickness, for example, from about 1 μm to about 100 µm, such as from about 10 µm to about 90 µm or from about 25 µm to about 80 µm.

The coating of the silane compound containing solution may dry in from about 5 minutes to about 12 hours, such as from about 10 minutes to about 10 hours or from about 15 minutes to about 5 hours. If the solution comprises isopropanol or similar alcohol solvents, for example ketones, such as acetone, the drying may occur more quickly than a drying of a solution comprising water as its solvent. In addition, applying heat may decrease the amount of time necessary to dry the solution because the solvent may evaporate more quickly. The method of delivering heat may be any suitable method, such as a heat gun, a heated oven or the like. The adhesive may then be applied to the coating after it has dried.

The surface treatment composition containing a silane compound may include from about 0.1 weight percent to about 25 weight percent silane compound, such as from about 0.5 weight percent to about 20 weight percent or from about 1 weight percent to about 15 weight percent silane compound. The remainder of the surface treatment includes the solvent, such as the water, isopropanol or other ketones or alcohols, and suitable optional additives as described herein.

In further embodiments, the adhesion promoting silane compounds may be added directly to the release agent to promote adhesion of an adhesive applied to a substrate having the release agent at least partially thereon. The silane compound chosen for direct addition to the release agent is particularly important as addition of an unacceptable silane compound to the release agent may cause a toner image on the substrate to smear. Any of the aforementioned silane compounds, as well as any other adhesion promoting silane compounds that are compatible with the release agent, are suitable for direct addition to the release agent as these silane compounds demonstrate compatibility with release agents and don't smear images. The silane compound may be added to the release agent at any time during the manufacture of the release agent.

The silane compound may be added to the release agent in amounts of from about 0.1 weight percent to about 25 weight percent of the release agent, such as from about 0.5 weight percent to about 20 weight percent or from about 1 weight percent to about 15 weight percent of the release agent.

In yet further embodiments, the silane compound may be added directly to the adhesive of the laminate or the bookbinding material, such as into pressure sensitive adhesive formulations or hot melt adhesive formulations. The hot melt adhesive composition disclosed in this invention comprises a hot melt adhesive composition and a silicone additive as an adhesion promoter for xerographic prints.

Examples of suitable adhesives for use herein include polyparaffin, polyacrylate, polyurethane, polyvinyl alcohol, polyalkylene oxide, natural rubber and copolymers thereof. Suitable hot melt adhesives suitable for use herein include most commercially available hot melt, adhesives, such as polyethylene, polyvinyl acetate, polyethylene acetate, polystyrene, polyamide, a polyolefin based polymer, polyester, phenol-formaldehyde resin, etc., of a homopolymer or a block copolymer based hot melt adhesives.

The adhesion promoter described herein provides at least two key functions in order to promote adhesion of the adhesive to the substrate: (1) a reactive silicone group for bonding with the xerographic print or substrate, such as a methoxy or an ethoxy group, and (2) an organic component for compatibility with the adhesive.

The silane compound may be added into the adhesive formulation at any time during the making of the adhesive formulation. The silane compound may be added to the adhesive formulation in amounts of from about 0.1 weight percent to about 25 weight percent of the adhesive formulation, such as from about 0.5 weight percent to about 20 weight percent or from about 1 weight percent to about 15 weight percent of the adhesive formulation.

By chemically bonding to both the adhesive and the substrate, the silane compound promotes the adhesion of an adhesive to a substrate having an oil contaminated surface with a SFE from about 8 $mN/m^2$ to about 30 $mN/m^2$, such as from about 8 $mN/m^2$ to about 28 $mN/m^2$ or from about 10 $mN/m^2$ to about 25 $mN/m^2$.

When the adhesion promoter is added directly to the adhesive, the formulation may further include a polymer resin, a tackifier, a plasticizer, a wax, an antioxidant or combinations thereof.

Examples of suitable polymer resins that may be used herein include poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene) and poly(butyl acrylate-isoprene), poly(styrene-butadiene), poly(methylstyrene-butadiene), poly(styrene-isoprene), poly(methylstyrene-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylonitrile-acrylic acid).

Examples of the optional tackifier suitable for use herein may include natural rosins, modified rosins, hydrocarbons and hydrogenated hydrocarbons, pure monomers and hydrogenated pure monomers aromatic petroleum hydrocarbon resins, alicyclic petroleum resins and combinations thereof.

Examples of the optional wax suitable for use herein may include natural and synthetic waxes. Examples of natural waxes may include animal wax such as beeswax and lanolin wax, vegetable wax such as carnauba wax, mineral wax such as montan wax and paraffin wax, microcrystalline wax and slack wax. Examples of synthetic waxes suitable for used herein may include polyethylene wax such as homopolymer wax and copolymer wax and modified polymer wax, polypropylene wax such as homopolymer wax and modified polymer wax, and Fisher-Tropsch wax such as homopolymer wax and modified polymer wax.

Examples of the optional plasticizer suitable for use herein may include, for example, paraffinic linear oil, naphthenic cycloaliphatic oil, aromatic ring containing oil, white mineral oil commercially available as KAYDOL oil, polyisobutylene commercially available as INDOPOL H300, pentaerythritol tetrabenzoate commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMID M-18-OL (C. P. Hall Company), a benyl phthalate, commercially available as SANTICIZER 278 (Ferro Corporation), mixtures thereof and the like.

Examples of the optional antioxidant suitable for use herein include N,N'-hexamethylene bis(3,5-di-tert-butyl-4-hydroxy hydrocinnamamide) (IRGANOX 1098, available from Ciba-Geigy Corporation), 2,2-bis(4-(2-(3,5-di-tert-butyl-4-hydroxyhydrocinnamoyloxy))ethoxyphenyl)propane (TOPANOL-205, available from ICI America Corporation), tris(4-tert-butyl-3-hydroxy-2,6-dimethyl benzyl)isocyanurate (CYANOX 1790, 41,322-4, LTDP, Aldrich D12,840-6), 2,2'-ethylidene bis(4,6-di-tert-butylphenyl)fluoro phosphonite (ETHANOX-398, available from Ethyl Corporation), tetrakis(2,4-di-tert-butylphenyl)-4,4'-biphenyl diphosphonite (ALDRICH 46,852-5; hardness value 90), pentaerythritol tetrastearate (TCI America #PO739), tributylammonium hypophosphite (Aldrich 42,009-3), 2,6-di-tert-butyl-4-methoxyphenol (Aldrich 25,106-2), 2,4-di-tert-butyl-6-(4-methoxybenzyl)phenol (Aldrich 23,008-1), 4-bromo-2,6-dimethylphenol (Aldrich 34,951-8), 4-bromo-3,5-didimethylphenol (Aldrich B6,420-2), 4-bromo-2-nitrophenol (Aldrich 30,987-7), 4-(diethyl aminomethyl)-2,5-dimethylphenol (Aldrich 14,668-4), 3-dimethylaminophenol (Aldrich D14, 400-2), 2-amino-4-tert-amylphenol (Aldrich 41,258-9), 2,6-bis(hydroxymethyl)-p-cresol (Aldrich 22,752-8), 2,2'-methylenediphenol (Aldrich B4,680-8), 5-(diethylamino)-2-nitrosophenol (Aldrich 26,951-4), 2,6-dichloro-4-fluorophenol (Aldrich 28,435-1), 2,6-dibromo fluoro phenol (Aldrich 26,003-7), α-trifluoro-o-cresol (Aldrich 21,979-7), 2-bromo-4-fluorophenol (Aldrich 30,246-5), 4-fluorophenol (Aldrich F 1,320-7), 4-chlorophenyl-2-chloro-1,1,2-tri-fluoroethyl sulfone (Aldrich 13,823-1), 3,4-difluoro phenylacetic acid (Aldrich 29,043-2), 3-fluorophenylacetic acid (Aldrich 24,804-5), 3,5-difluoro phenylacetic acid (Aldrich 29,044-0), 2-fluorophenylacetic acid (Aldrich 20,894-9), 2,5-bis(trifluoromethyl)benzoic acid (Aldrich 32,527-9), ethyl-2-(4-(4-(trifluoromethyl)phenoxy)phenoxy)propionate (Aldrich 25,074-0), tetrakis(2,4-di-tert-butyl phenyl)-4,4'-biphenyl diphosphonite (Aldrich 46,852-5), 4-tert-amyl phenol (Aldrich 15,384-2), 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof.

Embodiments described above will now be further illustrated by way of the following examples.

EXAMPLES

Oil contaminated test sheets used for a gluability test were generated by using a fusing apparatus. A total of 50 feeder sheets were fed through the fusing apparatus prior to fusing or contaminating the test sheets in order to stabilize the oil rate. The test sheets were duplex fused or contaminated by fuser oil on both sides at a set temperature of 185° C. and a process speed of 30 meters per minute without images on the paper. The oil rate was from about 10 to about 60 micrograms per copy. The test paper included cast coat heavy cover, gloss and silk coated covers, offset press pre-print forms on uncoated cover and text paper.

1.5 to 2 grams adhesive was heated to the application temperature, which is the binding machine operating temperature, with the viscosity being from about 4000 to about 6000 Centipoises. The adhesive was then manually applied to the oil contaminated paper sheet. A corresponding piece of the same page was placed on top of the liquid adhesive and a sandwich formation was made. The sandwich was placed in a sealer immediately under compression pressure (5 psi) for a period of about 3 seconds, then removed and allowed to cool. Paper tear (measure of gluability) was measured by manually separating the pieces of the sandwich and visually inspecting the results: 0% means there is no paper fiber tear (bad) and 100% means complete adhesion and tear (good).

Example 1

2.5% N-(2-aminoethyl)-3-aminopropylmethyldimethoxysilane ("Adhesion Promoter A") was incorporated into two separate hot melt adhesives comprising HENKEL® 80-8832 ("Adhesive 1") and COOL BIND® 1300 ("Adhesive 2"), respectively. Cast coat heavy cover and oil contaminated sheets were tested by using a gluability tester.

TABLE 1

| | Adhesive | | | |
|---|---|---|---|---|
| Paper | Adhesive 1 | Adhesive 1/ 2.5% Adhesion Promoter A | Adhesive 2 | Adhesive 2/ 2.5% Adhesion Promoter A |
| Cast Coat Heavy Sheets (%) Front to Front | 20 | 100 | 0 | 95 |
| Cast Coat Heavy Sheets (%) Back to Back | 0 | 95 | 0 | 100 |
| Oil Contaminated Sheets (%) Front to Front | 0 | 80 | 0 | 100 |
| Oil Contaminated Sheets (%) Back to Back | 0 | 80 | 0 | 95 |

Example 2

2.5% amino multifunctional oligosiloxane ("Adhesion Promoter B") was incorporated into two separate hot melt adhesives comprising DOWELL® 983 ("Adhesive 3") and US426® ("Adhesive 4"), respectively. Offset press pre-print form (with ink on the surface) oil contaminated sheet were tested using a gluability tester.

TABLE 2

| | Adhesive | | | |
|---|---|---|---|---|
| Paper | Adhesive 3 | Adhesive 3/ 2.5% Adhesion Promoter B | Adhesive 4 | Adhesive 4/ 2.5% Adhesion Promoter B |
| Pre-Print Form on Uncoated Cover Fiber Tear (unit %) | 0% | 65% | 0% | 80% |

Conclusions: The test results demonstrated that with a small amount of the adhesion promoter in a typical adhesive, the fiber tear increased from about 0-20% to about 80-100% on various medias, which indicates improved adhesion because the fiber unit increased.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An adhesion promoter composition comprising a silane compound and at least an adhesive, wherein the silane compound is represented by the following formula:

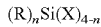

wherein R is a group selected from trifluoropropyl, an aryl group which further contains a halogen, and a vinyl group which further contains a halogen, X is a halogen, and n is an integer of 1, 2 or 3, wherein the adhesive is a pressure sensitive adhesive or a hot melt adhesive.

2. The adhesion promoter composition according to claim 1,
wherein the adhesive is a polymer resin selected from the group consisting of polyethylene, a poly(ethylene/vinyl acetate), a polystyrene, a polyamide, a polyolefin based polymer, a polyester, a phenol-formaldehyde resin, and a copolymer comprised thereof.

3. The adhesion promoter composition according to claim 1,
wherein the adhesion promoter composition further comprises a polymer resin, a tackifier, a plasticizer and/or an antioxidant.

4. The adhesion promoter composition according to claim 3, wherein the tackifier is selected from the group consisting of natural rosin, modified rosin, aromatic petroleum hydrocarbon resin, and alicyclic petroleum resin.

5. An adhesion promoter composition comprising a silane compound and at least an adhesive, wherein the silane compound is represented by the following formula:

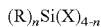

wherein R is an aryl group which further contains a halogen, X is a halogen, and n is an integer of 1, 2 or 3.

6. The adhesion promoter composition according to claim 5, wherein the adhesive is a pressure sensitive adhesive or a hot melt adhesive.

7. The adhesion promoter composition according to claim 5, wherein the adhesive is a polymer resin selected from the group consisting of polyethylene, a poly(ethylene/vinyl acetate), a polystyrene, a polyamide, a polyolefin based polymer, a polyester, a phenol-formaldehyde resin, and a copolymer comprised thereof.

8. The adhesion promoter composition according to claim 5, wherein the adhesion promoter composition further comprises a polymer resin, a tackifier, a plasticizer and/or an antioxidant.

9. The adhesion promoter composition according to claim 8, wherein the tackifier is selected from the group consisting of natural rosin, modified rosin, aromatic petroleum hydrocarbon resin, and alicyclic petroleum resin.

10. The adhesion promoter composition according to claim 5, wherein the silane compound is from 0.5 weight percent to about 15 weight percent of the adhesion composition.

11. An adhesion promoter composition comprising a silane compound and at least an adhesive, wherein the silane compound is represented by the following formula:

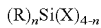

wherein R is a vinyl group which further contains a halogen, X is a halogen, and n is an integer of 1, 2 or 3.

12. The adhesion promoter composition according to claim 11, wherein the adhesive is a pressure sensitive adhesive or a hot melt adhesive.

13. The adhesion promoter composition according to claim 11, wherein the adhesive is a polymer resin selected from the group consisting of polyethylene, a poly(ethylene/vinyl acetate), a polystyrene, a polyamide, a polyolefin based polymer, a polyester, a phenol-formaldehyde resin, and a copolymer comprised thereof.

14. The adhesion promoter composition according to claim 11, wherein the adhesion promoter composition further comprises a polymer resin, a tackifier, a plasticizer and/or an antioxidant.

15. The adhesion promoter composition according to claim 14, wherein the tackifier is selected from the group consisting of natural rosin, modified rosin, aromatic petroleum hydrocarbon resin, and alicyclic petroleum resin.

16. The adhesion promoter composition according to claim 11, wherein the silane compound is from 0.5 weight percent to about 15 weight percent of the adhesion composition.

* * * * *